United States Patent
Prompt et al.

(10) Patent No.: US 9,081,767 B2
(45) Date of Patent: Jul. 14, 2015

(54) BROWSING OF CONTEXTUAL INFORMATION

(75) Inventors: Michel Prompt, Novato, CA (US); Claude Yves Martin Samuelson, Novato, CA (US)

(73) Assignee: Radiant Logic, Inc., Novato, CA (US)

(*) Notice: Subject to any disclaimer, the term of this patent is extended or adjusted under 35 U.S.C. 154(b) by 903 days.

(21) Appl. No.: 13/189,361

(22) Filed: Jul. 22, 2011

(65) Prior Publication Data

US 2012/0022856 A1    Jan. 26, 2012

Related U.S. Application Data

(60) Provisional application No. 61/367,838, filed on Jul. 26, 2010.

(51) Int. Cl.
- *G06F 17/27* (2006.01)
- *G06F 17/28* (2006.01)
- *G06F 17/30* (2006.01)
- *G06Q 10/08* (2012.01)

(52) U.S. Cl.
CPC ...... *G06F 17/2881* (2013.01); *G06F 17/30566* (2013.01); *G06Q 10/087* (2013.01)

(58) Field of Classification Search
CPC ..... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775; G06F 17/30867; G06F 17/30873

USPC .............. 704/1, 9, 10; 707/706–708; 715/534
See application file for complete search history.

(56) References Cited

U.S. PATENT DOCUMENTS

| | | | |
|---|---|---|---|
| 5,523,945 A * | 6/1996 | Satoh et al. | 704/9 |
| 5,617,119 A | 4/1997 | Briggs et al. | |
| 5,696,916 A * | 12/1997 | Yamazaki et al. | 715/853 |
| 6,985,905 B2 | 1/2006 | Prompt et al. | |
| 7,526,425 B2 * | 4/2009 | Marchisio et al. | 704/9 |
| 8,554,542 B2 | 10/2013 | Sandor et al. | |
| 2003/0217335 A1 | 11/2003 | Chung et al. | |
| 2004/0117352 A1 * | 6/2004 | Schabes et al. | 707/3 |
| 2004/0205085 A1 * | 10/2004 | Austin | 707/103 R |
| 2004/0221235 A1 * | 11/2004 | Marchisio et al. | 715/534 |

(Continued)

OTHER PUBLICATIONS

PCT International Search Report and Written Opinion, PCT Application No. PCT/US11/45251, Sep. 22, 2011, 14 pages.

*Primary Examiner* — Lamont Sponner
(74) *Attorney, Agent, or Firm* — Fenwick & West LLP

(57) ABSTRACT

Systems and methods for searching and browsing a data store of contextually related data objects. The system includes a search/browse module that receives a search query. The search/browse module identifies data objects that match the search query and generates sentences from data objects that are contextually related to the matching data objects. The sentences are human-readable sentences, for example in subject-verb-object format, where each sentence represents the relationship between two data objects. The sentences are output for display as a hierarchy of sentences. Additionally, a user can browse the data store of contextually related data objects by selecting a sentence that is displayed to the user. The search/browse module then outputs attributes of the data object represented by the sentence for display in two separate regions of a user interface.

16 Claims, 14 Drawing Sheets

(56) References Cited

U.S. PATENT DOCUMENTS

| | | | |
|---|---|---|---|
| 2005/0043940 A1* | 2/2005 | Elder | 704/9 |
| 2005/0108001 A1* | 5/2005 | Aarskog | 704/10 |
| 2005/0171685 A1* | 8/2005 | Leung et al. | 701/200 |
| 2005/0267871 A1* | 12/2005 | Marchisio et al. | 707/3 |
| 2006/0173873 A1* | 8/2006 | Prompt et al. | 707/100 |
| 2006/0230028 A1* | 10/2006 | Kellet et al. | 707/3 |
| 2007/0156669 A1 | 7/2007 | Marchisio et al. | |
| 2007/0219773 A1* | 9/2007 | Roux et al. | 704/1 |
| 2007/0250487 A1 | 10/2007 | Reuther | |
| 2008/0086498 A1* | 4/2008 | Sureka | 707/102 |
| 2008/0109454 A1* | 5/2008 | Willse et al. | 707/100 |
| 2008/0201300 A1* | 8/2008 | Goodwin et al. | 707/3 |
| 2008/0301120 A1* | 12/2008 | Zhu et al. | 707/5 |
| 2009/0063550 A1* | 3/2009 | Van Den Berg et al. | 707/102 |
| 2009/0070322 A1* | 3/2009 | Salvetti et al. | 707/5 |
| 2009/0089270 A1 | 4/2009 | Haley et al. | |
| 2009/0112828 A1 | 4/2009 | Rozenblatt | |
| 2009/0193325 A1* | 7/2009 | Fume | 715/205 |
| 2009/0271179 A1 | 10/2009 | Marchisio et al. | |
| 2009/0306963 A1 | 12/2009 | Prompt et al. | |
| 2010/0023496 A1* | 1/2010 | Mohan | 707/4 |
| 2010/0138416 A1* | 6/2010 | Bellotti | 707/736 |
| 2010/0169299 A1* | 7/2010 | Pollara | 707/708 |
| 2010/0174526 A1 | 7/2010 | Zhang | |
| 2010/0228693 A1* | 9/2010 | Dawson et al. | 706/12 |
| 2010/0274802 A1* | 10/2010 | Abe | 707/769 |
| 2010/0275165 A1* | 10/2010 | Koster | 715/856 |
| 2010/0287145 A1* | 11/2010 | Zeier et al. | 707/705 |
| 2011/0043652 A1* | 2/2011 | King et al. | 348/222.1 |
| 2011/0276322 A1 | 11/2011 | Sandor et al. | |

* cited by examiner

FIG. 9

BROWSING OF CONTEXTUAL INFORMATION

CROSS-REFERENCE TO RELATED APPLICATION(S)

This application claims priority under 35 U.S.C. §119(e) to U.S. Provisional Patent Application Ser. No. 61/367,838, "Searching and Browsing of Contextual Information" filed Jul. 26, 2010. The subject matter of all of the foregoing is incorporated herein by reference in their entirety.

BACKGROUND

1. Field of Art

This disclosure relates to systems and methods of searching and browsing contextual information, and specifically to searching and browsing a data store of data objects by displaying human-readable sentences that represent the relationships between the data objects.

2. Description of the Related Art

In an enterprise environment, information is stored in different data sources (e.g. applications, databases, directories), each having its own unique data structures. Much of the information in data sources across the enterprise infrastructure only makes sense in the context of relationships between data objects in the data structures. It is possible to collect the data objects in order to build a single datastore that lists the relationships between data objects. However, this complex web of inter-relationships is difficult to comprehend for a human being who is often the end user of such information. This problem is exacerbated for large enterprises that have hundreds of thousands of data objects, resulting in a gigantic spider-web of inter-relationships. As such, selecting a sub-set of information to display to the user and how to display it quickly becomes a challenging task.

Thus, there is lacking, inter alia, systems and methods of presenting data objects and their relationships to other data objects in a way that is easy to comprehend.

SUMMARY

The disclosure includes systems, methods, and computer readable medium for searching and browsing a data store of contextually related data objects. In one embodiment, a search/browse module receives a search query and identifies data objects that match the search query from a datastore of data objects. Sentences are generated from data objects that are in the parent context of the matching data objects. The sentences are human-readable sentences, for example in subject-verb-object format, representing the relationship between two data objects. The subject of a sentence represents one data object and the object of a sentence represents another data object. The sentences are organized as a hierarchy of sentences and output for display in a user interface. As a result, a human user reading the sentences can easily understand the relationship between the various data objects represented in the sentences.

In one embodiment, the search/browse module enables a user to browse the data store of contextual information. The search/browse module outputs one or more sentences generated from the data objects in the data store for display in a user interface. The sentences may be displayed as a hierarchy of sentences, and some of the sentences may have objects that represent multiple data objects. The user selects a sentence, and in response, the search/browse module identifies and provides, for display in the user interface, attributes for the data object represented by a subject of the selected sentence and a data object represented by a subject of the sentence. As a result, a human user viewing the user interface can not only understand the relationship between the various data objects represented in the sentences, but is also provided with additional details for understanding the nature of the data objects themselves.

In one specific embodiment for searching the datastore of data objects, the search/browse module receives a search query and identifies, from the datastore of data objects, a first data object that matches the search query. The search/browse module generates a first sentence that includes a subject, verb and object. The object of the first sentence represents the first data object and the subject of the first sentence representing a second data object that is related to the first data object. The search/browse module also generates a second sentence that includes a subject, verb and object. The object of the second sentence represents the second data object and the subject of the second sentence representing a third data object that is related to the second data object. The search/browse module then provides the first and second sentences for display as a multi-level hierarchy such that the first sentence is in a subordinate level of the hierarchy and the second sentence is in a superior level of the hierarchy.

The verb of a sentence may represent a relationship between the data objects represented by the subject and object of a sentence. Further, the subject and object of a sentence may be comprised of attributes or identifiers for the data object represented by the subject or object of the sentence.

In one specific embodiment for browsing the datastore of data objects, the search/browse module provides a first sentence for display in a first region of a user interface. The first sentence has a subject, verb and object. The subject represents a first data object from the datastore of data objects and the object representing at least a second data object from the datastore of data objects that is related to the first data object. The search/browse module receives a user input selecting the first sentence. In response, the search/browse module proves, for display in a second region of the user interface, one or more attributes of the first data object represented by the subject of the first sentence. The search/browse module also provides, for display in a third region of the user interface, one or more attributes of the second data object represented by the object of the first sentence.

In some embodiments, the object of a sentence may be a generic object that represents multiple data objects. The data objects represented by the generic object belong to a common class and are grouped together to simplify the display of sentences. When a sentence with a generic object is selected, the attributes for each of the data objects represented by the generic object may be displayed in the third region of the user interface. Additionally, there may be multiple sentences displayed in the first region of the user interface that are displayed as a multi-level hierarchy of sentences with superior and subordinate levels.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

FIG. 9 is the user interface of FIG. 8 showing the selection of an object from a table of objects.

The figures depict embodiments of the disclosed embodiments for purposes of illustration only. One skilled in the art will readily recognize from the following discussion that alternative embodiments of the structures and methods illustrated herein may be employed without departing from the principles described herein.

DETAILED DESCRIPTION

The disclosed configurations include systems and methods for searching and browsing a data store of related data objects. By way of example, a system receives a search query and displays search results as a hierarchy of contextually related sentences. The system can receive browse commands and display other sentences that are contextually related to the selected sentence. Also disclosed is an intelligent user interface that displays attributes of the subject and object of a selected sentence.

Reference will now be made in detail to several embodiments, examples of which are illustrated in the accompanying figures. It is noted that wherever practicable, similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

In part I, a configuration of the system and the process of building a data store of data objects and relationships between the data objects will be first be described. In Part II, a method and user interface for searching and browsing data objects and their relationships will be described in greater detail.

I. Configuration Overview

This section describes a high-level configuration of the system as well as the process of building a data store of data objects and relationships between the data objects.

Figure 1:
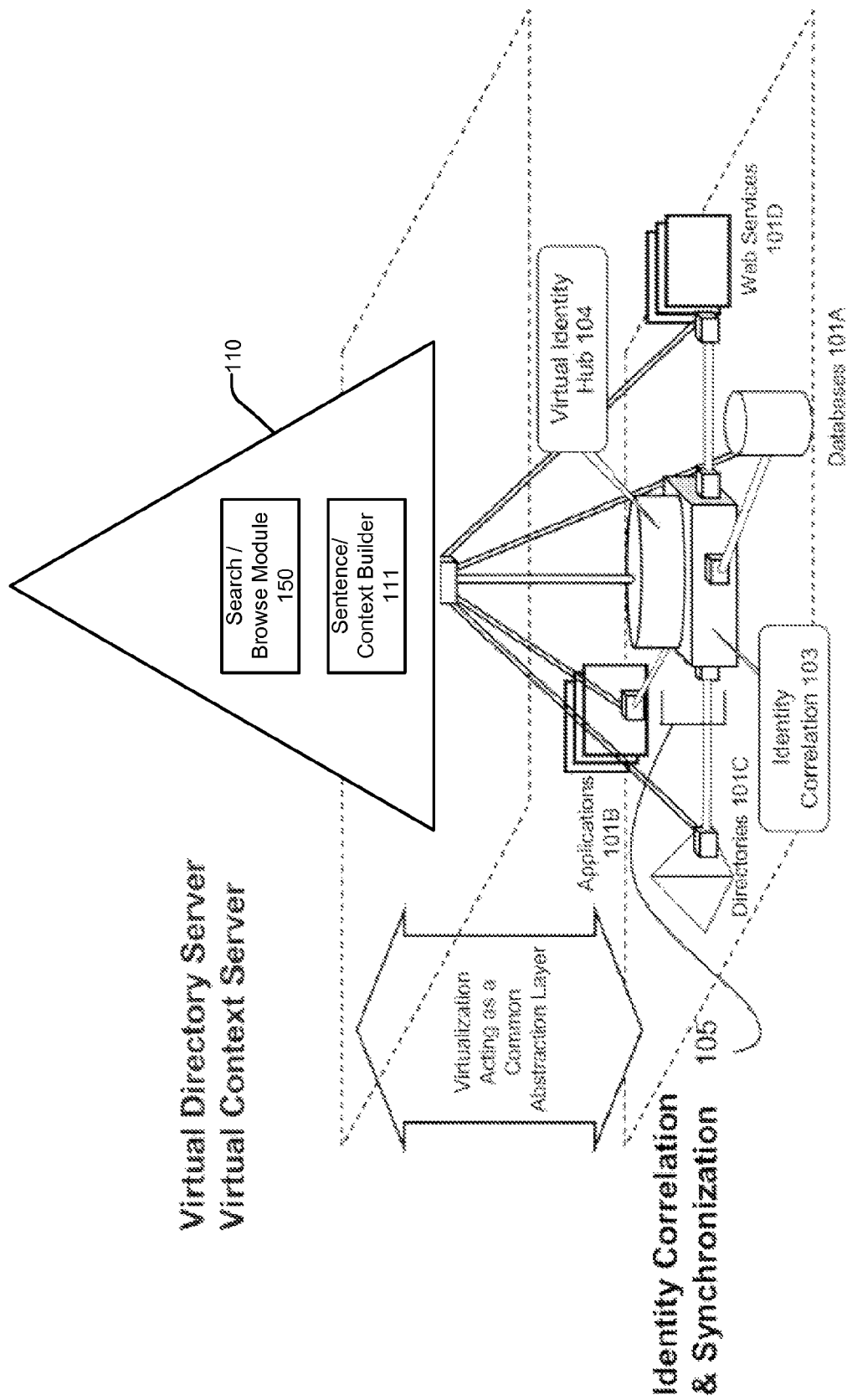
FIG. 1 is an illustration of one embodiment of an enterprise architecture that includes modules within the virtual directory/context server.

FIG. 1 is an illustration of an enterprise architecture 100 that includes a sentence/context builder 111 and search/browse module 150 within the virtual directory/context server 110, in accordance with an embodiment. As shown in FIG. 1, data from a variety of data sources, including databases 101A, applications 101B, directories 101C, and Web Services 101D is correlated and synchronized by an identity correlation and synchronization module ("ICS") 105. The ICS 105 comprises an identity correlation module 103 and a virtual identity hub 104. The identity correlation module 103 eliminates duplicates by correlating information that refers to the same entity using any technique known to those of skill in the art. The virtual identity hub 104 comprises a set of database tables and business rules that the identity correlation module 103 uses to establish correlation. The virtual identity hub 104 creates and stores the global links for those identities that have been established as correlated per the business rules.

The virtual directory/context server 110 functions using a common abstraction layer to access data from the databases 101A, applications 101B, directories 101C, Web Services 101D, and other data sources within the enterprise 100. The operation of a suitable virtual directory server is described in U.S. Pat. No. 6,985,905, issued Jan. 10, 2006, entitled "System And Method For Providing Access To Databases Via Directories And Other Hierarchical Structures and Interfaces," which is hereby incorporated by reference in its entirety.

In one embodiment, the virtual directory/context server 110 includes a plurality of modules, including a sentence/context builder module 111 and a search/browse module 150. The sentence/context builder module 111 translates relationships between data objects from a plurality of data sources 101A-D into a human-readable form, for example, an English language sentence or a sentence in another language. This operation of a suitable sentence/context builder module is described in U.S. patent application Ser. No. 12/134,841, filed Jun. 8, 2008 entitled "Representation of Objects and Relationships in Databases, Directories, Web Services, and Applications as Sentences as a Method to Represent Context in Structured Data," now published as U.S. Publication 2009/0306963, which is hereby incorporated by reference in its entirety. Applications can then view and access the data from the data sources 101A-D of the enterprise 100 through the search/browse module 150, for example, using the sentences created by the sentence/context builder 111. The operations of the search/browse module 150 will be described in further detail below.

Figure 2A:
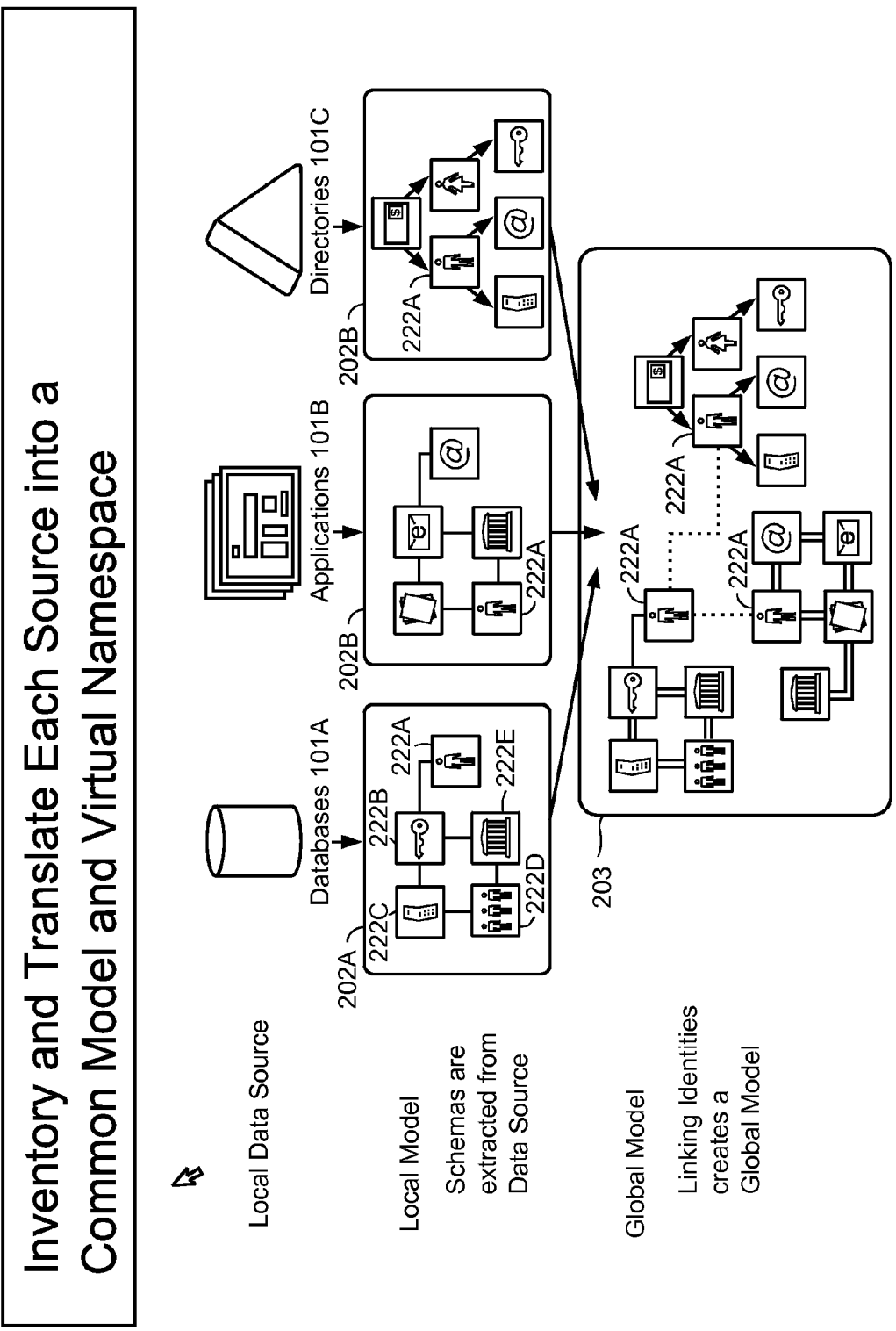
FIG. 2A is an illustration of the extraction of schemas/metadata from local or application domain specific data sources that are then translated into the global model.

FIG. 2A is an illustration of the extraction of schemas from data sources 101A-C to form local models 202A-C, according to one embodiment of the ICS 105. As shown in FIG. 2A, the local models are illustrated as connections between square icons, for example icons 222A-E that each represents a data object. Each connection represents a relationship between two data objects that exists in the data source 101A. As has been described, for example in U.S. Pat. No. 6,985,905, issued Jan. 10, 2006, entitled "System And Method For Providing Access To Databases Via Directories And Other Hierarchical Structures and Interfaces," which has been incorporated by reference, a schema manager is used to extract the schema and detect all relationships that exist between the data objects stored in a data source.

Once the local models 202A-C have been formed, a global model 203 is created by linking a data object, for example object 222A across local models by recognizing that a data object as represented in two or more local models actually refer to the same entity or identity. As shown in FIG. 2A, sometimes the same objects/entities can be differently represented in different data sources. Within the enterprise, there is often more than one definition of an entity, and while they share some common attributes, they can differ considerably and are not interchangeable. In one embodiment, the translation of the local models 202A-C into the global model 203 is facilitated by the presence of a common unique identifier of the data object 222A within the local models 202A-C. In other implementations, the translation of the local models 202A-C into the global model 203 relies on the operation of ICS 105 programmed to correlate data objects despite the lack of a common unique identifier across local models 202A-C. For example, in FIG. 2A, the icons representing a person 222A could be instances of the same person with a different set of identifiers which are specific to each application domain. In this case, before a set of links between different representations of an entity can be made, it is sometimes needed to establish a correlation between these different identities and create a "union" of those identities. This operation is performed by the identity correlation module 103 in cooperation with the virtual identity hub 104 as described above. Once those identities are linked into a table by the ICS 105, this table is virtualized and added to the global model. In turn, the new table acts as a bridge (as a union of identities) between data objects in the different segregated application domains. As a result, a new path exists between each previously segregated application domain, and sentences can then be created across these application domains.

Figure 2B:
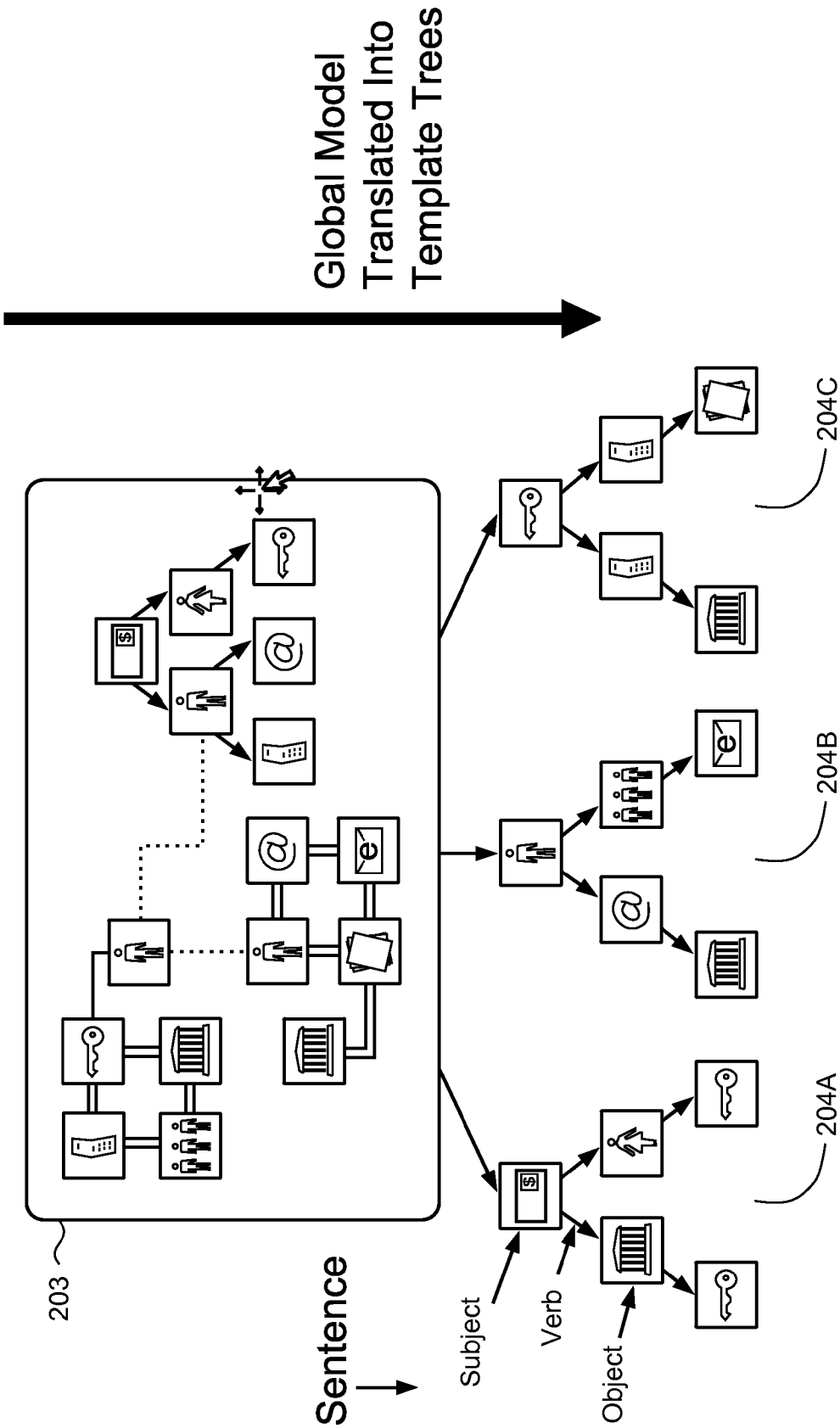
FIG. 2B is an illustration of the translation of the global model to trees of verbs and objects.

Turning now to FIG. 2B, illustrated is the translation of the global model 203 into template trees 204A-C of related data objects, in accordance with an embodiment of the context/sentence builder 111. A tree configuration is a valuable way to represent relationships between data objects that can also be used to generate human-readable sentences that describe the relationships between data objects. As previously stated, one embodiment of a context/sentence builder 111 for translating a global model into trees is described in U.S. patent application Ser. No. 12/134,841, filed Jun. 8, 2008 entitled "Representation of Objects and Relationships in Databases, Directories, Web Services, and Applications as Sentences as a Method to Represent Context in Structured Data," now published as U.S. Publication 2009/0306963, which has been incorporated by reference. The context/sentence builder 111 creates template trees by receiving a user input selecting two classes of data objects and a further user input specifying the relationship between the selected objects. One class of data object is selected as the subject of a sentence, a related class of data object is selected as the object of the sentence, and the relationship between them is tagged a verb that describes the relationship between the objects. The template trees are then populated with data objects to create indexed tree structures, and from these indexed tree structures, human-readable sentences describing two or more related data objects can be generated. These indexed tree structures are saved into a data store.

Figure 2C:
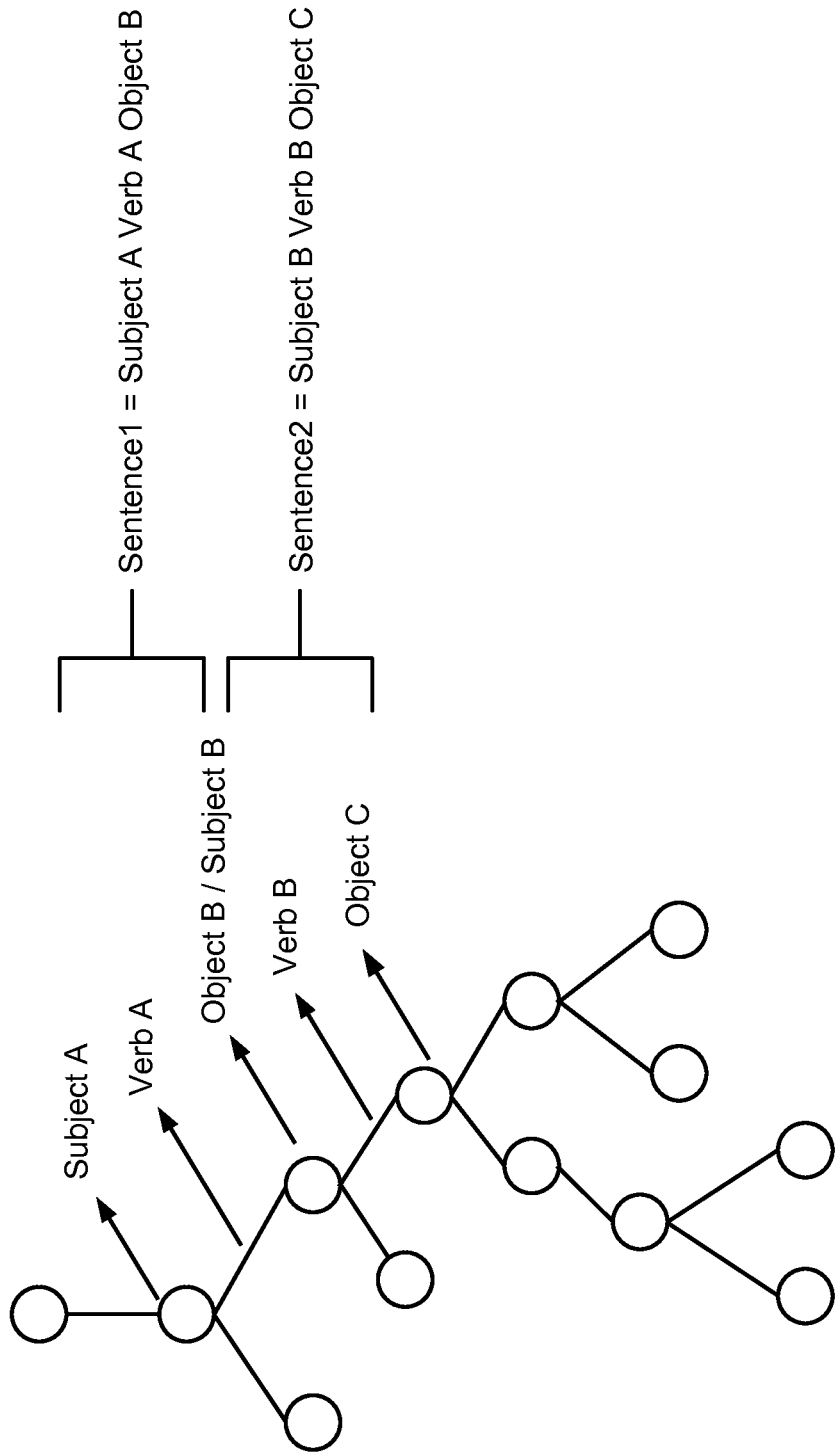
FIG. 2C is an illustration of a tree as a way to represent sentences.

Referring to FIG. 2C, illustrated is a detailed representation of the indexed tree structures created by the context/sentence builder 111. A tree structure can be visualized as a set of nodes with links that connect the nodes. Each node in the tree represents a data object from the global model. Each link in the tree is attached to a "verb" that describes the relationship between two data objects. A sentence can be generated from the tree by treating one data object, also known as the source data object, as the "subject" of a sentence. Another data object, also known as the target data object, is treated as the "object" of the sentence. The link connecting the two data objects is the "verb" of the sentence. The resulting sentence takes the form "subject verb object."

Due to the configuration of the tree, a data object that is the subject of one sentence may be the object of a different sentence. For example, in FIG. 2C, one sentence is Subject A Verb A Object B, and another sentence is Subject B Verb B Object C. Data object "B" is used as both the object of the first sentence and the subject of the second sentence. The tree is thus a valuable way to represent context, and can be used to generate human readable sentences that describe, in simple grammar, a relationship between two data objects.

Each data object in the tree also belongs to a certain "class" of data objects. Exemplary classes include: Customer, Sales Representative, Order, Account, etc. This list is not meant to be exhaustive, and many other classes are possible. Each data object in the tree is also associated with a set of attributes that describe characteristics, properties, or information associated with the data object. For example, if a particular data object is of the class "Customer", the data object could have following attributes:

first name=Jim
last name=Simmons
telephone number=(345) 656-1122
fax number=(345) 656-1123
address=122 Radiant Drive
e-mail address=jim.simmons@gmail.com In one embodiment, the system is configured so that whenever a sentence is generated with a data object, the class of the data object is included in the sentence to help identify the data object. The system is also configured to include, in the sentence, one or more pre-selected attributes of the data object that more specifically identify the data object. For example, suppose the system is configured so that every time a data object of the class "customer" is used to create a sentence, the "first name" attribute is included in the sentence. Thus, a sentence generated using the data object in the previous paragraph as the subject of the sentence could read "Customer Jim placed order 1."

The sentence/context builder 111 may produce multiple tree structures, each of which is mounted under a specific context. A specific context is a user defined arbitrary label to describe a specific situation, background, context, etc. of the tree. For example, a tree that contains a list of salespersons, the accounts they manage, and the products sold by each account could be labeled with a specific context called "salesforce_with_relationships." A tree that contains a list of drivers, their cars, and the dealer that sold the car could be labeled with a specific context called "drivers_with_relationships." Similar to how relationships between data objects are associated with a verb, the relationship between the specific context and the tree structure can also be associated with a verb.

Figure 2D:
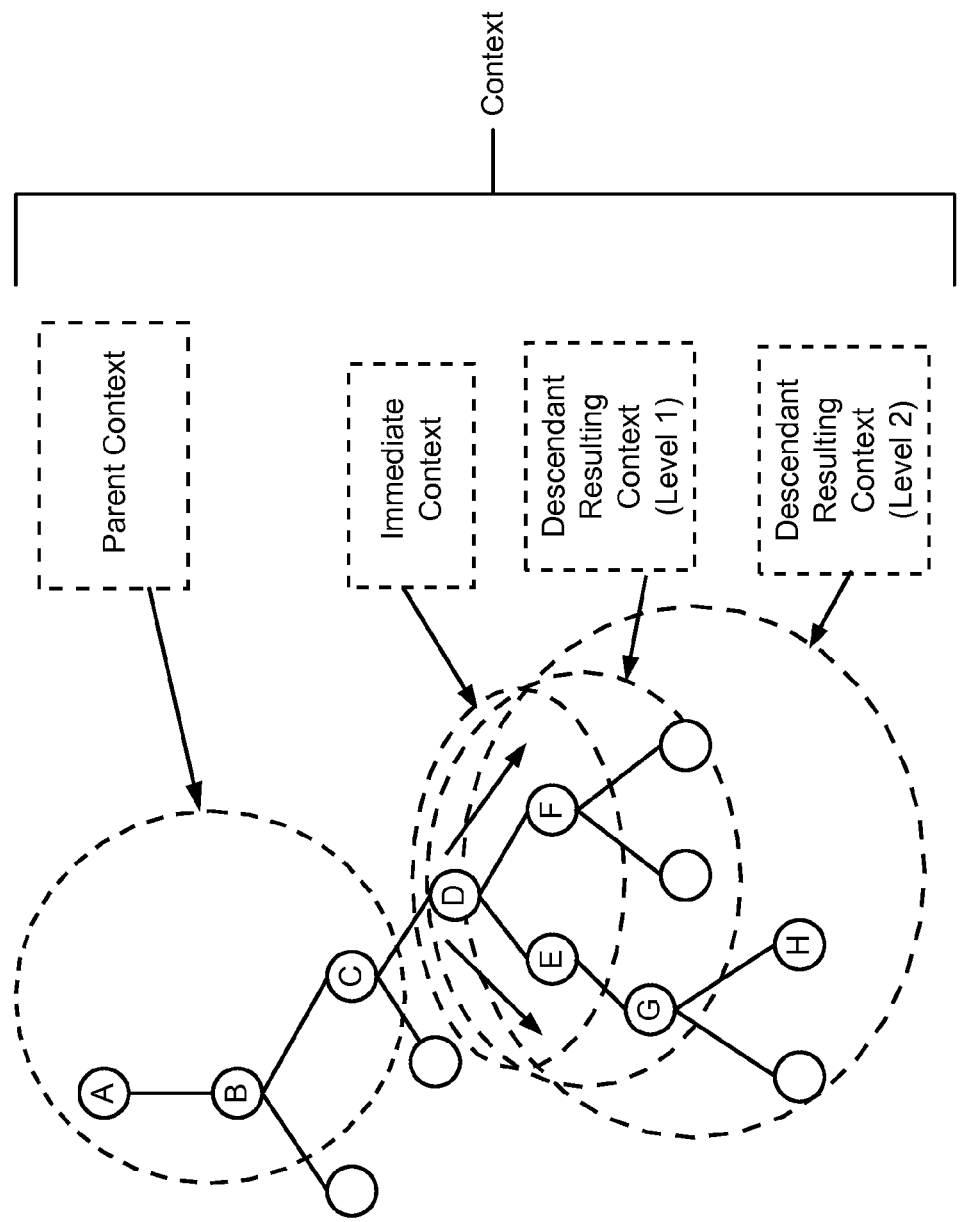
FIG. 2D is an illustration of a tree as a way to represent sentences and contexts.

FIG. 2D is an illustration of a tree as a way to represent sentences and contexts. In the English language, the word "context" generally has two meanings: 1 The parts of a sentence, paragraph, or discourse immediately next to or surrounding a specified word or passage and determining its exact meaning; 2. The whole situation, background or environment relevant to a particular event, personality, creation, etc. . . . As used herein, the word "context" has both of the above meanings. FIG. 2D illustrates that through the tree structure, the "immediate context" is the data objects and relationships immediately next to a data object. However, the whole situation or environment relevant to a data object can be ascertained by examining a larger portion of the tree surrounding the data object, such as various levels of "descendant resulting contexts" or the "parent context." Thus, trees are a way to represent both immediate contexts as well as the larger environmental contexts of data objects in the tree. The idea of "parent" "immediate" and "descendant' contexts will be referenced below in describing the operation of the search/ browse module 150.

For example, in FIG. 2D, suppose data object D is a customer by the name of Laura, data object E is a car made by Toyota, data object G is a car dealer by the name of Joe, and data object H is the city of Oakland. A sentence generated from the immediate context of data object D, which includes data object E, could be "Customer Laura bought a Car Toyota." Diving into the level 1 of the descendant resulting context for data object D, which includes object E and G, generate the sentence "Car Toyota was delivered by Dealer Joe." Diving into the level 2 of the descendant resulting context for data object D, which includes data objects G and H, could generate the sentence "Dealer Joe is located in City Oakland." Thus, the sentence representation of data objects is an efficient mechanism to pull meaning from complicated inter-relationships among data.

II. Searching and Browsing

A. Searching for Data Objects

Figure 3A:
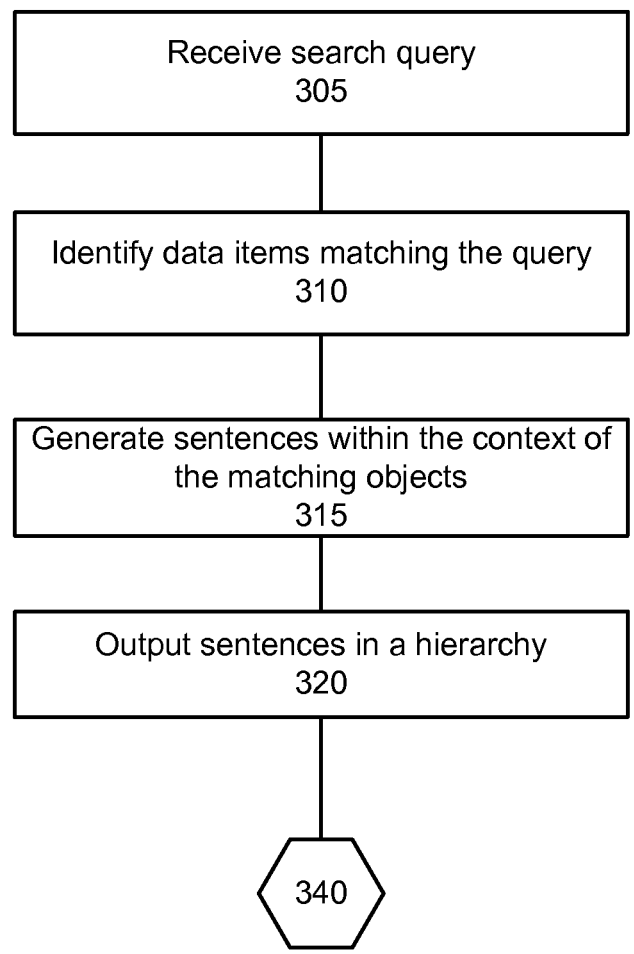
FIG. 3A is a flow chart illustrating a method of searching and displaying a hierarchy of sentences.

At this point, the VCS 110 has collected data from various sources, generated a global model of data objects, and translated the global model into several trees of related data objects. The search/browse module 150 now allows the user to search the data object trees and organizes the search results in an intuitive manner to facilitate the user's understanding of the context of the search results. The operation of the search/ browse module will be described by reference to FIG. 3A, which illustrates a flow chart of a method of searching and displaying a hierarchy of sentences, in accordance with one embodiment. Specific examples of the steps of the method are illustrated in the screen shots of the following figures.

Figure 4:
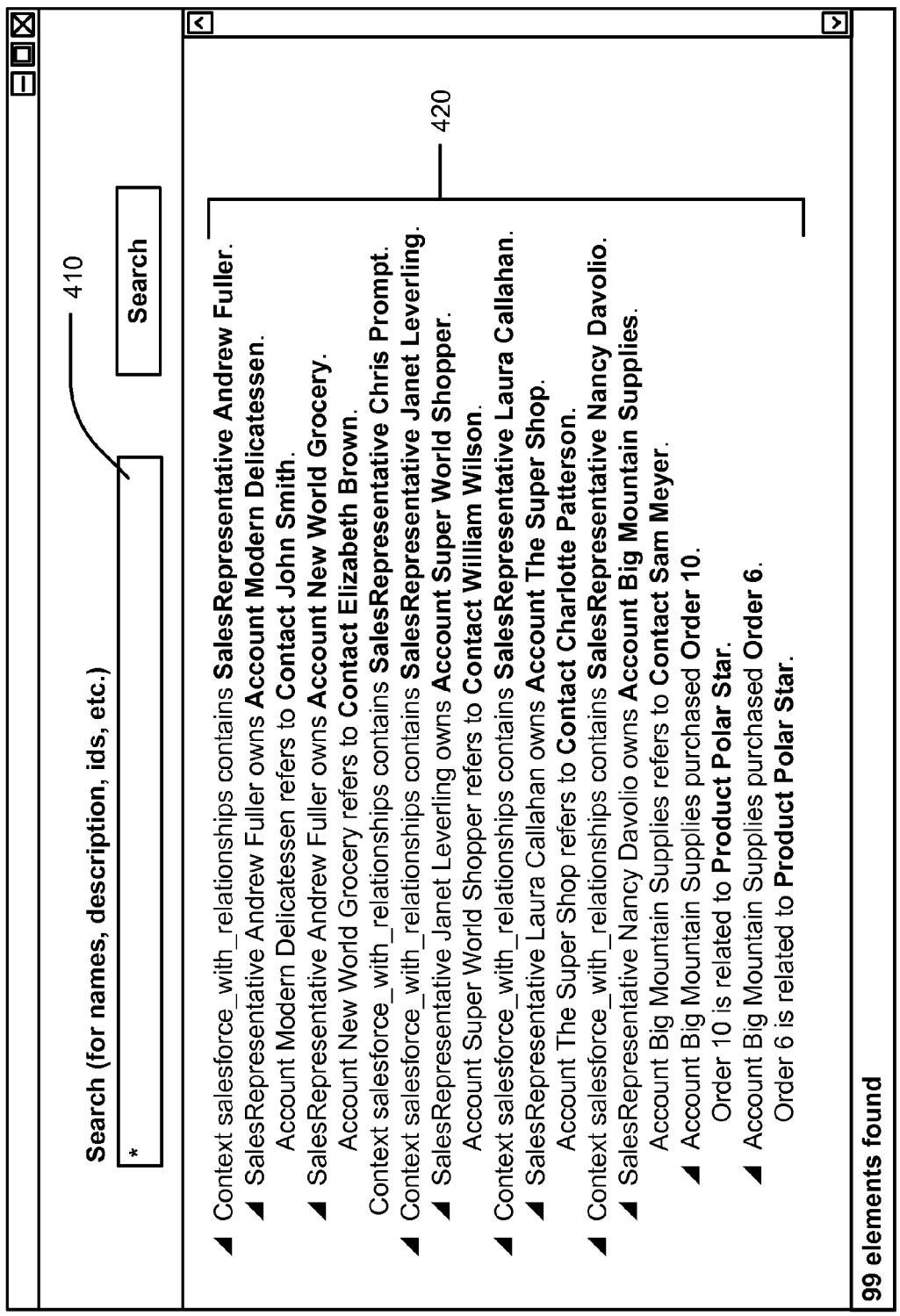
FIG. 4 is an illustration of a user interface for entering a search query and displaying search results.

In step 305, the search/browse module 150 receives a search query. The search query may be received, for example, from a client that connects to the VCS 110 over a network or received from an input device that is coupled directly to the VCS 110. The search query supports standard search syntax known to one skilled in the art, such as keyword searches and Boolean logic searches (e.g. AND, OR, NOT). For example, referring to FIG. 4, illustrated is a user interface for entering a search query and displaying search results, according to one embodiment. The user interface includes a search box 410 for receiving search queries from a user. In this particular example, the search query is "*", which is a wildcard search.

Referring back to FIG. 3, in step 310, search/browse module identifies data objects that match the search query. As noted before, each data object is associated with a table of attributes. In one embodiment, if any of a data object's attributes match the search query, then the data object is considered to be a match. For example if the search query is for "shoe" then a data object with an attribute of "product type=running shoes" would match the search query. Similarly, a data object with an attribute of "store name=Payless Shoes" would also match the search query. Alternatively, other techniques for matching the search query to the data objects may be used.

In step 315, search/browse module 150 generates sentences from the context of the data object that was identified in step 310. In one embodiment, the search/browse module 150 generates sentences within the parent context of the matching data objects. First, the indexed tree structures of FIG. 2D are traversed to locate the matching data objects within the tree structures. In one embodiment, the search/ browse module 150 traverses every one of the indexed tree structures to locate matching data objects. In another embodiment, the search/browse module 150 only traverses a sub-set of the indexed tree structures, as defined by system settings or selected by a user. In another embodiment, the search/browse module only locates data objects that are within a select portion of a particular tree structure, such as the descendant context below a certain position in a particular tree. The extent of the search can be configured by a user or set in according to a default configuration.

Next, for each tree structure, the search/browse module 150 identifies data objects in the parent context of the matching data object. For example, data objects between the matching data object and the top the tree may be identified as part of the parent context. From these data objects and their relationships, a human-readable sentence of the form "Subject-Verb-Object" can be generated. For example, referring back to FIG. 2D, if data object D is a data object that matches the search query and data object A is the top of the tree, the parent context includes three sentences: A-verb1-B, B-verb2-C, and C-verb3-D. In one embodiment, sentences can be generated with different word orders, such as "Subject-Object-Verb". This embodiment is particularly applicable to some languages, for example Hindi, Japanese, and Korean, in which the object precedes the verb of a sentence.

In one embodiment, the parent context also includes a sentence that links a "specific context" to the data object at the top of the tree structure. As described before, each tree structure is labeled with a user-defined specific context that describes the relationships within the tree. The relationship between the specific context and the tree can also be generated into a sentence. For example, in FIG. 2D, a sentence generated from a specific context could be of the form "Specific context-verb-object A." In another embodiment, sentences can be identified not only from the parent context, but also from the immediate context or resulting contexts of a matching data object.

Referring again to FIG. 3, in step 320, the search/browse module 150 outputs the sentences identified by step 315 in a hierarchal format by providing the sentences for display to a client device or output device attached to the VCS 110. By organizing the search results (i.e., the generated sentences) in a hierarchy, the user viewing the search results can easily understand the context in which the results appear. For example, referring again to FIG. 4, the user has entered a wildcard search and in response, the search/browse module 150 outputs a hierarchal display of sentences 420. Each sentence is output in "subject verb object" format. A hierarchal display of sentences 420 has several ordered levels that represent parent and descending contexts, similar to how a tree of data objects has several levels of parent and descending contexts. Each sentence in a lower level (i.e., subordinate level) belongs to a sentence in a higher level (i.e., superior level) of the hierarchy. The subject of each sentence in a lower level is substantially the same as the object of the sentence in the immediately higher level. Lower level sentences are placed beneath the sentence that they belong to. The hierarchical level of a sentence may be indicated by indenting the sentence from the left side of the screen. Thus, higher level sentences may be placed closer to the edge of the user interface, whereas lower levels are placed further from the edge of the user interface.

Figure 5:
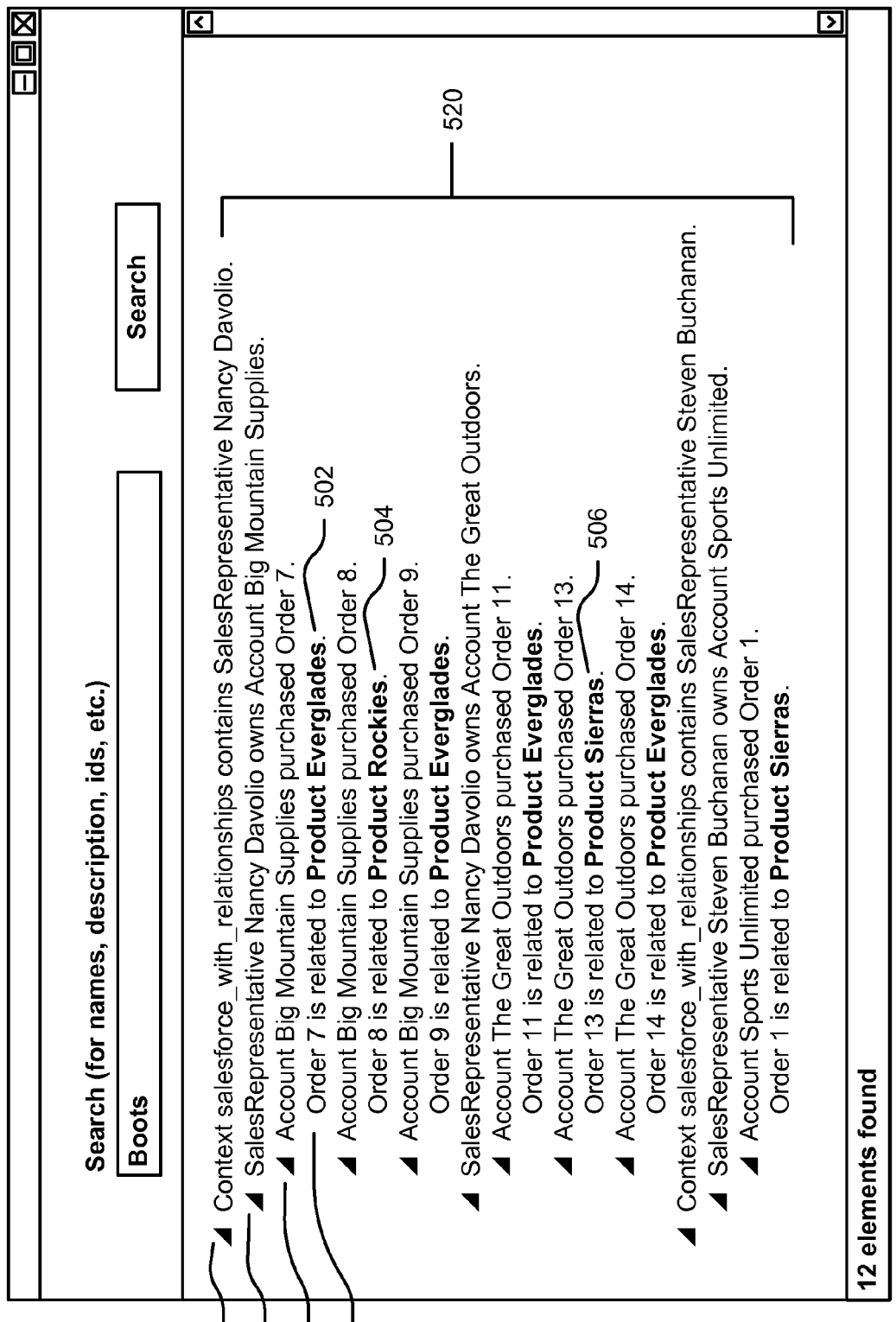
FIG. 5 is an illustration of a user interface for displaying search results after receiving a search query for the word "boots."

Referring to FIG. 5, illustrated is a user interface for displaying search results after receiving a search query for the word "boots". Here, the search/browse module 150 finds at least three data objects that match the search query: Product Everglades 502, Product Rockies 504, and Product Sierras 506. The parent context for each of the matching data objects is identified from the stored tree structures and sentences are generated from the parent context of the matching data objects. One particular sentence is "Order 7 is related to Product Everglades" 550. Other sentences in the parent context include "Account Big Mountain Supplies purchased Order 7" 552, "SalesRepresentative Nancy Davolio owns Account Big Mountain Supplies" 554, and "Context salesforce_with_relationships contains SalesRepresentative Nancy Davolio" 556. The sentences are organized as a hierarchy such that the subject of a sentence in a subordinate level of the hierarchy (e.g., sentence 550) is also the object of a sentence in an immediately superior level of the hierarchy (e.g., sentence 552).

In one embodiment, the data objects that match the search query can also be displayed in the user interface in a visually distinctive manner that distinguishes the data objects from the rest of the words in the displayed sentences. For example, the matching data objects can be displayed with highlighting, color, bold text, shading, or underlining. Referring again to FIG. 5, the data objects Product Everglades 502, Product Rockies 504, and Product Sierras 506 match the search query for "boots". The identifiers for these data objects are thus displayed with bold text, whereas the rest of the words in the sentences are displayed with plain text.

B. Browsing of Data Objects

Figure 3B:
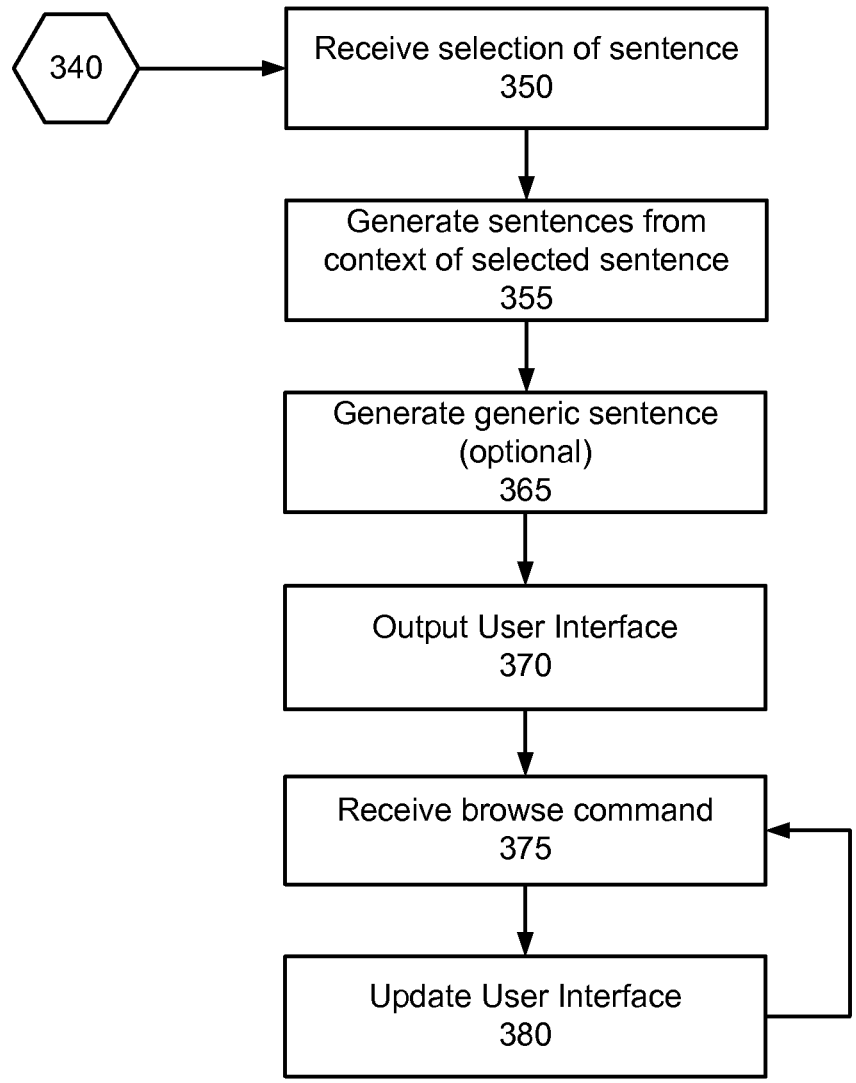
FIG. 3B is a flow chart illustrating a method of browsing a hierarchy of sentences.
Figure 6:
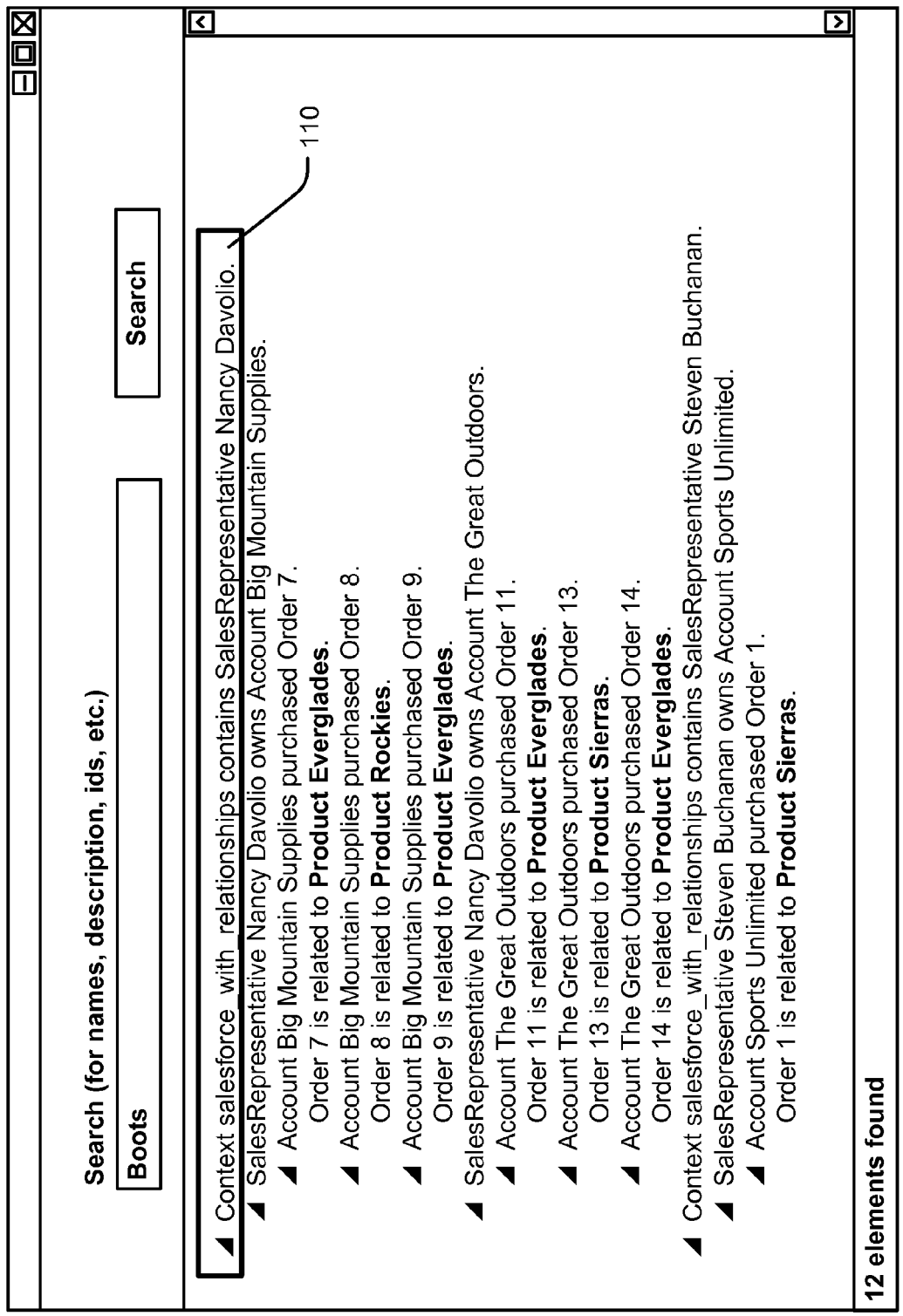
FIG. 6 is an illustration of the user interface of FIG. 5 showing the selection of a sentence from a hierarchy of sentences.

Referring now to FIG. 3B, illustrated is a method for browsing a data store of related data objects, according to one embodiment of the search/display module 150. In step 350, the search/browse module 150 receives a user input selecting a sentence from one or more displayed sentences. Referring to FIG. 6, illustrated is the user interface of FIG. 5 showing the selection of a sentence from a hierarchy of sentences. In this figure, the user selects the first sentence 110 in the interface, which is highlighted with a rectangular box to indicate that a selection has been made. Other embodiments of selecting a sentence are also possible. For example, the user may select a sentence from the sentences that are displayed in the upper region of the user interfaces of FIG. 7 and FIG. 8. In some embodiments, the selected sentence may be a generic sentence.

Referring back to FIG. 3B, in step 355, the search/browse module 150 may generate one or more sentences from the context of the selected sentence. For example, the search/browse module 150 may generate sentences from the parent context, immediate context, or descendant context of the object of the selected sentence. As discussed previously, these sentences can be generated by traversing the indexed tree structures of FIG. 2D.

In step 365, sentences within the immediate context may be grouped together if they share a common class of data objects. In some instances, the immediate context of a data object can refer to multiple data objects of the same class. In other words, there could be a 1:N relationship between one data object and other data objects in the tree structure. In this case, displaying each sentence in the immediate context as a separate sentence can be cumbersome and repetitive. For example, referring again to FIG. 5, the selected sentence is "Context salesforce_withrelationships contains SalesRepresentative Nancy Davolio." Sentences in the immediate context of SalesRepresentative Nancy Davolio include "SalesRepresentative Nancy Davolio owns Account Big Mountain Supplies" and "SalesRepresentative Nancy Davolio owns Account The Great Outdoors." The sentences could be individually displayed as:

Context salesforce_withrelationships contains SalesRepresentative Nancy Davolio.

SalesRepresentative Nancy Davolio owns Account Big Mountain Supplies

SalesRepresentative Nancy Davolio owns Account The Great Outdoors.

However, individually displaying each sentence in this manner can be cumbersome and repetitive, particularly in cases where the immediate context includes many sentences. Thus, when multiple sentences have the same subject but have data objects that belong to a common class of data objects, the search/browse module 150 groups the sentences into a single generic sentence. In this example, "SalesRepresentative Nancy Davolio owns Account Big Mountain Supplies" and "SalesRepresentative Nancy Davolio owns Account The Great Outdoors" are grouped together and replaced with the generic sentence "SalesRepresentative Nancy Davolio owns 2 Accounts." The generic sentence has the same subject (e.g., "SalesRepresentative Nancy Davolio") and verb (e.g. "owns") as the original sentences. However, the generic sentence has a generic object that is composed of: (1) the class of the data objects (e.g., "Accounts") represented by the objects of the original sentences, and (2) a number (e.g., "2") that indicates how many data objects are represented by the generic object.

In step 370, the search/browse module 150 outputs a user interface that can be displayed to a user. In one embodiment, the search/browse module 150 may provide the following information for display: (1) the selected sentence (2) sentences within the context of the selected sentence (3) attributes for the data object represented by the object of the selected sentence and/or (4) attributes for the data object represented by the subject of the selected sentence.

Figure 7:
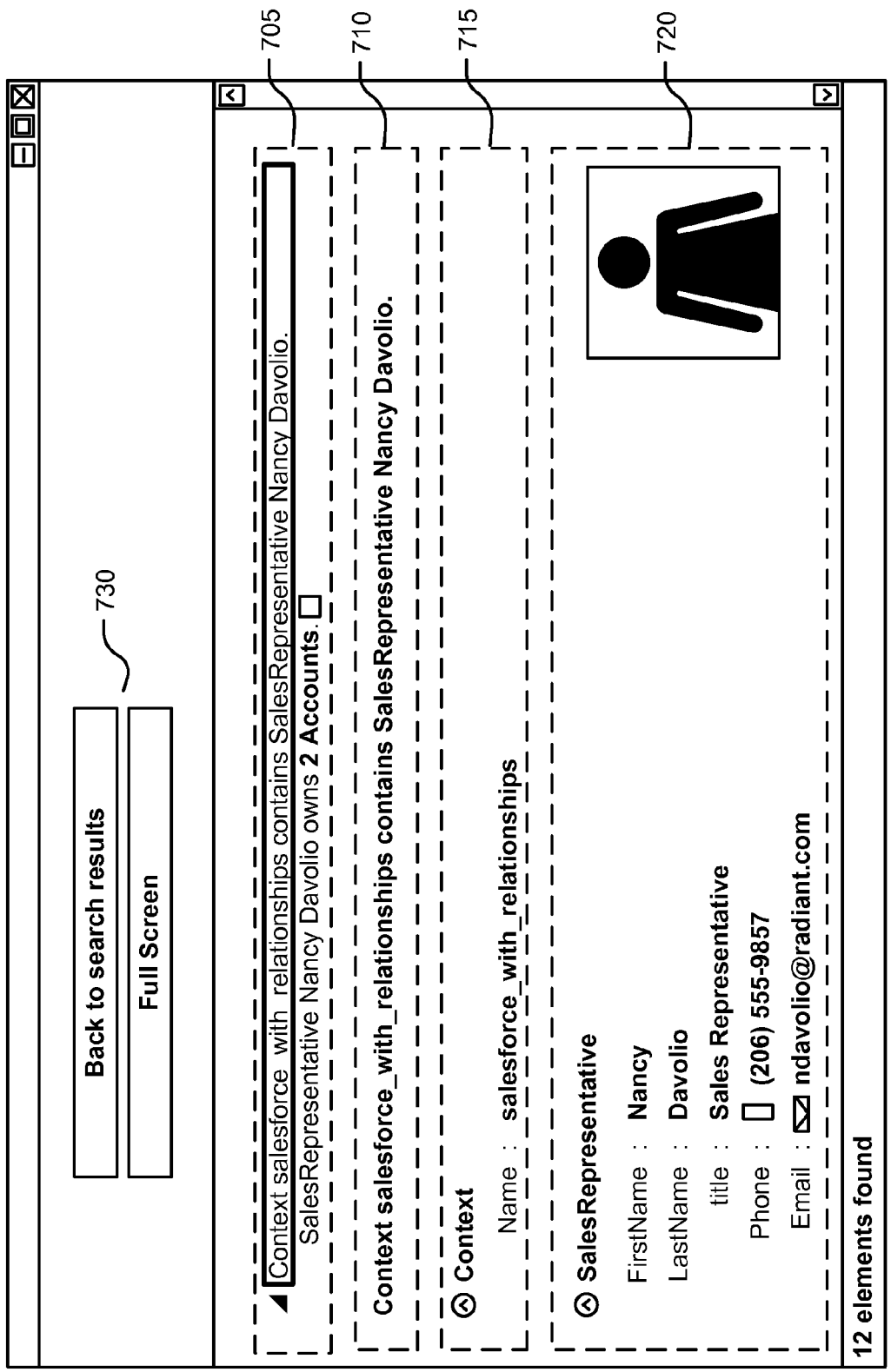
FIG. 7 is an illustration of a user interface with multiple regions for browsing a hierarchy of sentences.

In one embodiment, the information is displayed in different interactive display windows or regions of a user interface. Referring to FIG. 7, illustrated is a user interface for browsing a hierarchy of sentences, according to one embodiment. One region 705 is for displaying the selected sentence and sentences generated from the context of the selected sentence. The sentences are displayed as a hierarchy of sentences with subordinate and superior levels, similar to the hierarchy of sentences in FIGS. 4-6. If a generic sentence was generated in step 365, it is displayed in place of the individual sentences represented by the generic sentence. For example, in FIG. 7, the generic sentence is "SalesRepresentative Nancy Davolio owns 2 accounts."

A second region 715 is for displaying attributes of the data object represented by the subject of the selected sentence. A third region 720 is for displaying attributes of the data object represented by the object of the selected sentence. The attributes in the second 715 and third regions 720 are displayed as a list of attributes, although in other embodiments, other methods of displaying the attributes are possible. In one embodiment, the attributes may be identified from information stored in the datastore for the data objects. Displaying attributes of the data objects in conjunction with the contextual hierarchy of sentences is beneficial for providing the user with detailed information about the data objects without losing track of the contextual relationship between the data objects and their relationships to other data objects.

In one embodiment, all the attributes of a data object can be output for display. In another embodiment, the attributes are output in accordance with pre-configured system settings. For example, in FIG. 7, the system has been configured so that whenever a sentence with a data object of the class "Salesrepresentative" is selected, only the firstname, lastname, title, phone, email, and picture of the object are output for display in region 720. Other attributes such as birthday, date of hire, social security number, and address are not output for display. The settings may be configured differently for each class of data object. Further, the same configuration settings can be applied regardless of whether a data object is used as the subject or object of a sentence. Displaying only a sub-set of the attributes is advantageous because it prevents the system from overwhelming the user with useless information or displaying potentially sensitive information (e.g., social security number).

Other features of the user interface include an additional region 710 for displaying the selected sentence. This is an optional region that may not be utilized in all embodiments. The User Interface also includes buttons 730 that allow the user to return to the search results or to display the interface in full screen mode.

The user interface is interactive, allowing the user to navigate through the displays to find information that is of interest. Referring back to FIG. 3B, as the search/browse module 150 receives 375 browsing commands, the information displayed in the user interface is updated 380 in accordance with the received command, for example, by identifying and providing updated attributes and sentences for display in the user interface. In other words, by interacting with the disclosed user interface, the user can browse through the data objects and relationships between the data objects that are stored in the indexed tree structures to find specific information.

Figure 8:
FIG. 8 is an illustration of a user interface with multiple regions for browsing a hierarchy of sentences when a generic sentence is selected.

In one embodiment, the search/browse module 150 receives 375 a browsing command that selects one of the displayed sentences. Referring now to FIG. 8, illustrated is a user interface with multiple regions for browsing a hierarchy of sentences when a generic sentence 840 is selected, according to one embodiment. Here, the user has selected the generic sentence "SalesRepresentative Nancy Davolio owns 2 accounts" 840. This generic sentence 840 represents a relationship between the subject Nancy Davolio and two separate data objects: Account Big Mountain Supplies and Account The Great Outdoors. When the user selects a generic sentence, the region 720 that normally displays attributes corresponding to the object of the sentence is updated to display a table that includes the attributes for each of the underlying data objects represented by the generic object of the generic sentence 840. Thus, in FIG. 8, region 720 includes the attributes for both Account Big Mountain Supplies and Account The Great Outdoors. Each data object is placed on a different line of the table. Additionally, the data objects can be sorted by their displayed attributes. Region 715 is also updated to include attributes corresponding to the data object that is represented by the subject, SalesRepresentative Nancy Davolio, of the selected sentence 840.

Figure 9:
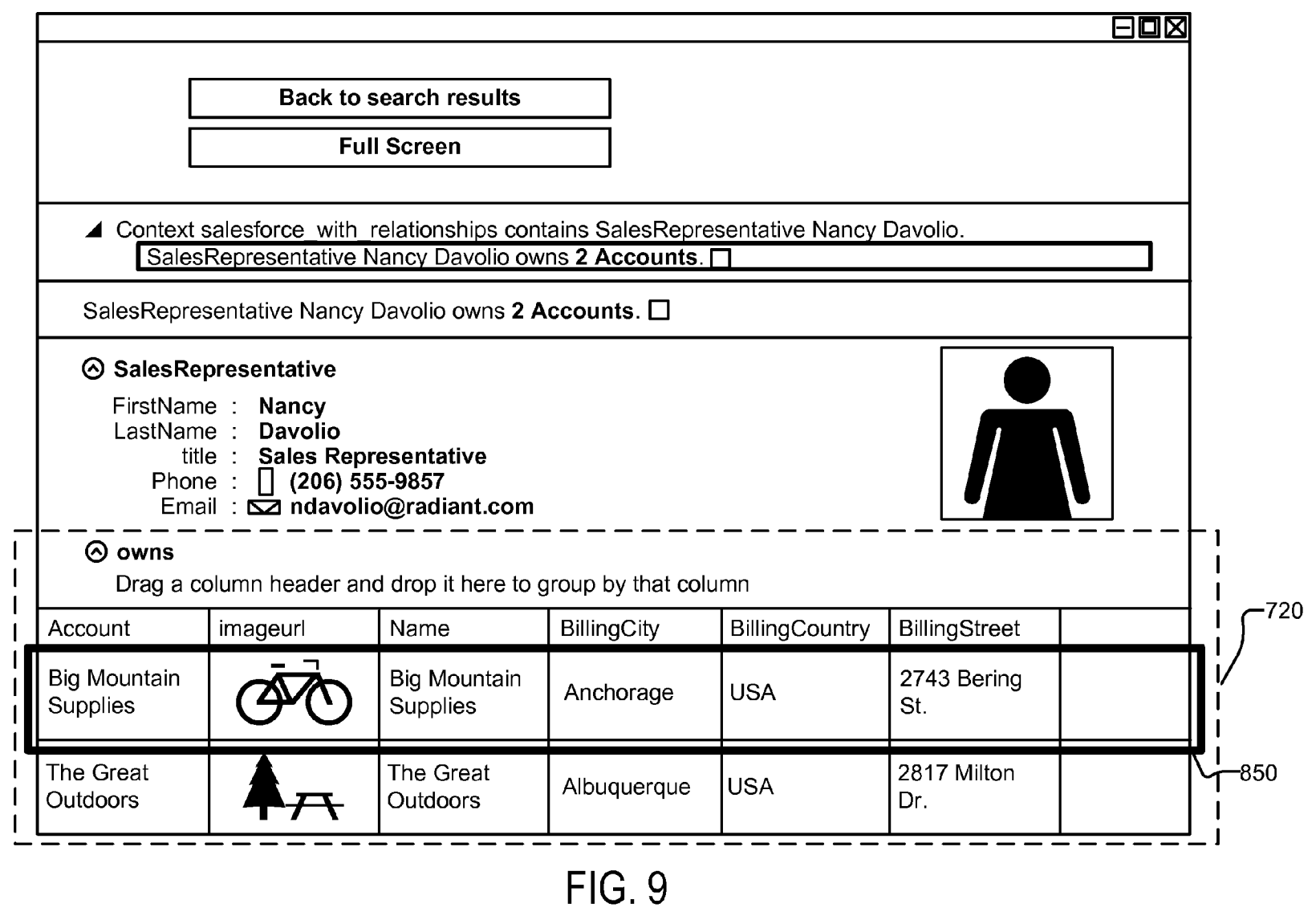
Figure 10:
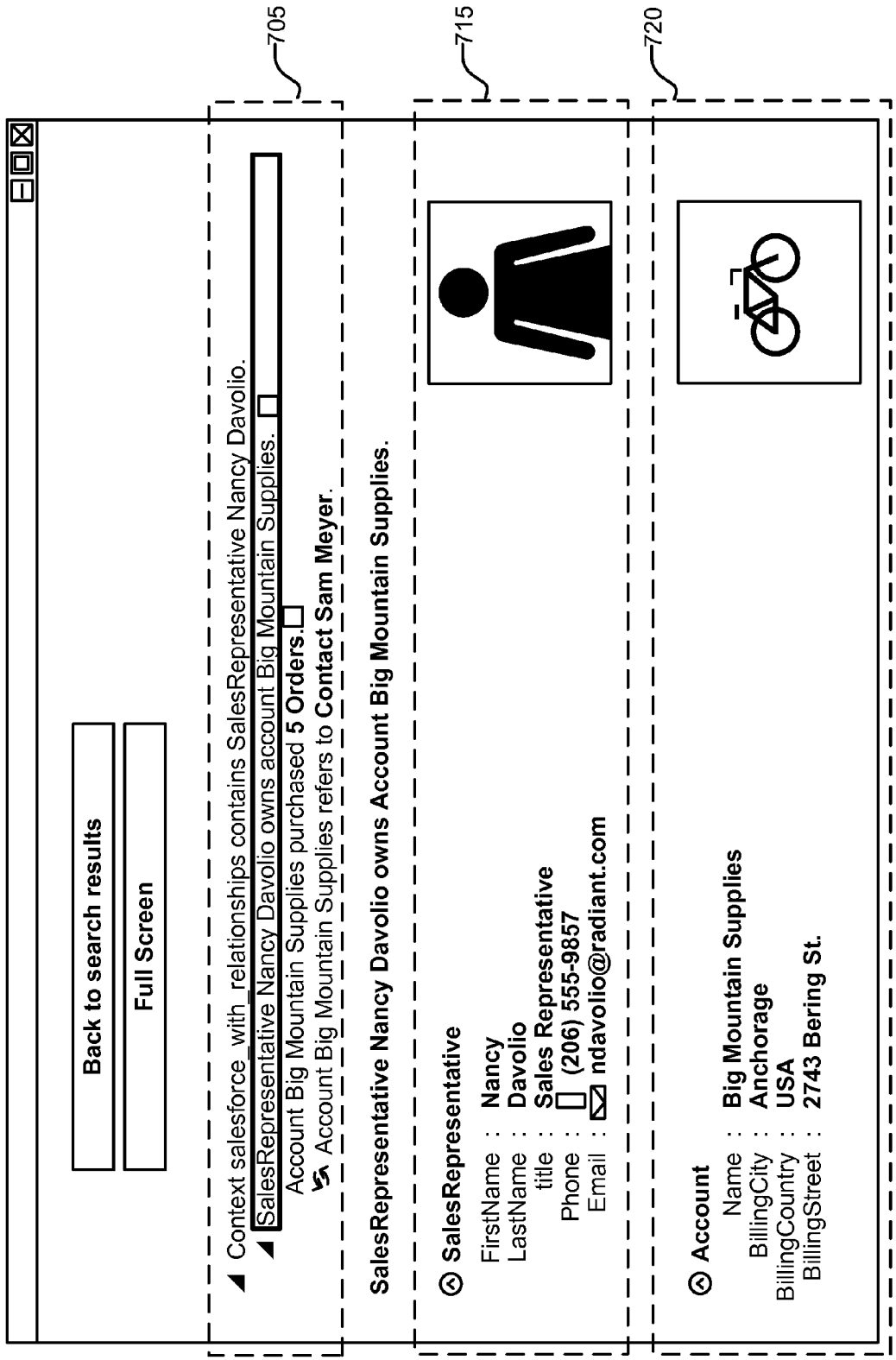
FIG. 10 is an illustration of a user interface with multiple regions for browsing a hierarchy of sentences that is updated in accordance with the user's selection of a new sentence.

Referring now to FIG. 9, illustrated is the user interface of FIG. 8 that shows the selection of a data object from the table of attributes in region 830. In another embodiment, the search/browse engine receives 375 a browse command that selects one of the data objects displayed in region 720. Here, the user has selected the first data object 850 in region 720, named Big Mountain Supplies. Referring now to FIG. 10, illustrated is the user interface of FIG. 9 after the user selects a data object. In responsive to receiving the selection, the search/browse module 150 updates 380 the user interface by drilling down into the next level of the hierarchy and displaying the immediate context of the selected data object. As before, one region 705 of the user interface displays an updated hierarchy of sentences. Another region 715 displays attributes of the data object represented by the subject of the sentence, SalesRepresentative Nancy Davolio. Another region 720 displays attributes of the data object represented by the object of the sentence, Account Big Mountain Supplies.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosed embodiments. This description should be read to include one or at least one and the singular also includes the plural unless it is obvious that it is meant otherwise.

Upon reading this disclosure, those of skill in the art will appreciate still additional alternative structural and functional designs for a system and a process for searching and browsing a data store of contextual information through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for browsing a datastore of data objects, the method comprising:
providing a first sentence for display in a first region of a user interface, the first sentence having a subject, verb and object, the object of the first sentence representing a first data object from the datastore of data objects, the datastore associating the first data object with a plurality of attributes describing characteristics of the first data object;
providing a second sentence for display in the first region of a user interface, the second sentence having a subject, verb and object, the subject of the second sentence representing the first data object from the datastore of data objects and the object of the second sentence representing at least a second data object from the datastore of data objects that is related to the first data object, the datastore associating the second data object with a plurality of attributes describing characteristics of the second data object, the first sentence and the second sentence organized in the user interface as a hierarchy that includes a plurality of levels and the first sentence is in a superior level of the hierarchy and the second sentence is in a subordinate level of the hierarchy;
receiving, by a computer, a user input selecting the second sentence displayed in the subordinate level of the hierarchy in the first region of the user interface; and
responsive to receiving the user input selecting the second sentence displayed in the subordinate level of the hierarchy in the first region of the user interface:
providing, for display in a second region of the user interface, one or more of the attributes of the first data object represented by the subject of the second sentence; and
providing, for display in a third region of the user interface, one or more of the attributes of the second data object represented by the object of the second sentence.

2. The method of claim 1, wherein providing the second sentence for display comprises providing the second sentence for display with a verb that indicates a relationship between the first and second data objects.

3. The method of claim 1, wherein providing the second sentence for display comprises providing the second sentence for display with an object that is a generic object, the generic object representing a plurality of data objects.

4. The method of claim 3, wherein the plurality of data objects belong to a common class and the generic object comprises an identifier for the common class.

5. The method of claim 3, wherein the generic object comprises an indication of a number of the data objects represented by the generic object.

6. The method of claim 3, wherein providing, for display in the third region of the interface, one or more attributes of the second data object represented by the object of the second sentence comprises providing, for display in the third region of the user interface, one or more attributes for each of the plurality of data objects represented by the generic object.

7. The method of claim 1, further comprising providing the second sentence for display in a fourth region of the user interface responsive to receiving the user input selecting the second sentence.

8. The method of claim 1, wherein providing, for display in a second region of the interface, one or more attributes of the first data object comprises providing, for display in the second region of the interface, one or more attributes of the first data object that are fewer than all the attributes of the first data object.

9. A non-transitory computer readable medium configured to store instructions for browsing a datastore of data objects, the instructions when executed by a processor perform steps comprising:
providing a first sentence for display in a first region of a user interface, the first sentence having a subject, verb and object, the object of the first sentence representing a first data object from the datastore of data objects, the datastore associating the first data object with a plurality of attributes describing characteristics of the first data object;
providing a second sentence for display in the first region of a user interface, the second sentence having a subject, verb and object, the subject of the second sentence representing the first data object from the datastore of data objects and the object of the second sentence representing at least a second data object from the datastore of data objects that is related to the first data object, the datastore associating the second data object with a plurality of attributes describing characteristics of the second data object, the first sentence and the second sentence organized in the user interface as a hierarchy that includes a plurality of levels and the first sentence is in a superior level of the hierarchy and the second sentence is in a subordinate level of the hierarchy;
receiving a user input selecting the second sentence displayed in the subordinate level of the hierarchy in the first region of the user interface; and
responsive to receiving the user input selecting the second sentence displayed in the subordinate level of the hierarchy in the first region of the user interface:
providing, for display in a second region of the user interface, one or more of the attributes of the first data object represented by the subject of the second sentence; and
providing, for display in a third region of the user interface, one or more of the attributes of the second data object represented by the object of the second sentence.

10. The non-transitory computer readable medium of claim 9, wherein providing the second sentence for display comprises providing the second sentence for display with a verb that indicates a relationship between the first and second data objects.

11. The non-transitory computer readable medium of claim 9, wherein providing the second sentence for display comprises providing the second sentence for display with an object that is a generic object, the generic object representing a plurality of data objects.

12. The non-transitory computer readable medium of claim 11, wherein the plurality of data objects belong to a common class and the generic object comprises an identifier for the common class.

13. The non-transitory computer readable medium of claim 11, wherein the generic object comprises an indication of a number of the data objects represented by the generic object.

14. The non-transitory computer readable medium of claim 11, wherein providing, for display in the third region of the interface, one or more attributes of the second data object represented by the object of the second sentence comprises providing, for display in the third region of the user interface, one or more attributes for each of the plurality of data objects represented by the generic object.

15. The non-transitory computer readable medium of claim 9, further comprising providing the second sentence for display in a fourth region of the user interface responsive to receiving the user input selecting the second sentence.

16. The non-transitory computer readable medium of claim 9, wherein providing, for display in a second region of the interface, one or more attributes of the first data object comprises providing, for display in the second region of the interface, one or more attributes of the first data object that are fewer than all the attributes of the first data object.

* * * * *